P. L. CROWE & A. FRANKENHEIM.
SPROCKET WHEEL.
APPLICATION FILED NOV. 21, 1914.
1,278,861.
Patented Sept. 17, 1918.
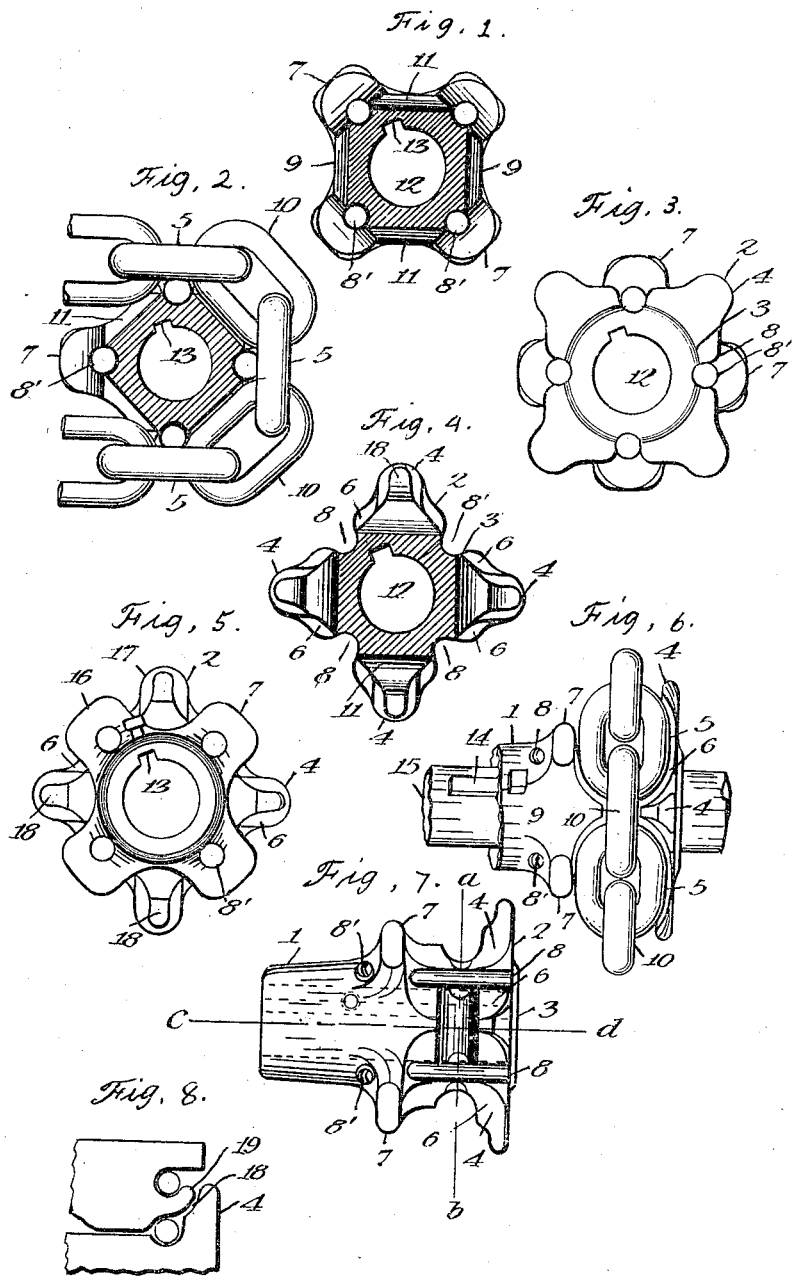

UNITED STATES PATENT OFFICE.

PAUL L. CROWE, OF JERSEY CITY, NEW JERSEY, AND AARON FRANKENHEIM, OF NEW YORK, N. Y.

SPROCKET-WHEEL.

1,278,861.   Specification of Letters Patent.   Patented Sept. 17, 1918.

Application filed November 21, 1914. Serial No. 873,273.

*To all whom it may concern:*

Be it known that we, PAUL L. CROWE and AARON FRANKENHEIM, citizens of the United States, residing at Jersey City, in the county of Hudson and State of New Jersey, and in the borough of Bronx, in the county of Bronx and State of New York, respectively, have invented certain new and useful Improvements in Sprocket-Wheels, of which the following is a specification.

Our invention consists of an improvement in sprocket wheels for use in connection with mechanical stokers of the chain grate type. The object of the invention is to provide a sprocket wheel which is specially adapted to receive and transmit driving power through the chain, the particular feature of the invention herein involved relating to means whereby the connecting device between the chain and the grate bar may be accommodated upon the sprocket wheel, and providing for access thereto while on the wheel.

In the accompanying drawings illustrating preferred constructions of the invention—

Figure 1 is a cross sectional view of a sprocket wheel taken on the line *a, b,* of Fig. 7, looking toward the left.

Fig. 2 is a similar sectional view showing the carrying chain in position.

Fig. 3 is a face view in elevation of the sprocket wheel from the outer end.

Fig. 4 is a cross sectional view similar to Fig. 1 but in the opposite direction.

Fig. 5 is a view of the sprocket wheel in elevation from the inner side.

Fig. 6 is an edge view of the sprocket wheel showing the chain in position thereon.

Fig. 7 is a similar view with the chain removed.

Fig. 8 is a detail diagrammatic view showing the relative position of the grate bar and sprocket wheel, broken away.

The sprocket wheel of the present invention is so constructed as to provide for driving engagement with the carrying chain of the grate bars, of well-known construction, and is adapted to provide for the passage of the chain thereover and at the same time to facilitate the placement and displacement of the means securing the chain to the grate bar.

The sprocket wheel as illustrated, provides for engagement with vertical links and four horizontal links of the chain, successively, although such number may be varied.

The sprocket wheel is provided with a hub portion 1 integral with the wheel member having at its outer portion the series of sprocket projections 2, the outer end of the shell hub having an annular bearing shoulder 3. The inner portions of the projections 2 are provided with inner projections 4 adapted to interfit and engage with the chain links 5 and is also provided with a series of depressions 6, alternating between projections 4, adapted to facilitate engagement with the chain links.

Depressions 6 extend respectively across the bearing face of the sprocket and merge into the opposite alternating sprockets 7, arranged intermediate of sprockets 4, and assist in positioning the links and provide additional engagement therefor. Innermost depressions 8 are arranged across the bearing face of the sprocket between projections 4 and extend into and through the base portions of opposite projections 7, opening at the opposite inner side thereof as indicated at 8'. The object of this construction is to provide clearance and a seating channel for each of the pins which connect the grate bar with the chain. The object in thus extending the depression 8 through to the other side of the projection 7 is that any suitable device can be inserted for removal of the pin while the chain and grate bars are in position on the sprocket. Each sprocket wheel is provided with a depression 11 extending lengthwise of the chain, in its direction when in place, between and transversely of each pair of cross depressions 8, for clearance of the inner side of each vertical link 10.

The opening 12 of each sprocket is provided at one side with the usual key way 13 and by key 14 the sprocket is mounted on shaft 15, a set screw also being preferably employed to bind the members in position. Key way 13 is preferably located midway between the projections at opposite sides and ends of the sprocket so as to distribute the strain and provide for the spacing of a sprocket wheel on either end of the shaft. By this means one sprocket wheel can be located on the same shaft in proper relation to the other sprocket wheel whereby to offset the sprockets.

As shown in Fig. 8 the inner face of each outer sprocket projection is cut away as indicated at 18 for clearance of the terminal grate bar hook 19 and permitting it to freely pass over the sprocket wheel without interference.

What we claim is:

1. A sprocket wheel for continuous chain grates having a series of inner and outer sprocket projections at each side of an annular chain-receiving portion, said portion having a series of transverse grooves terminating in openings extending through the bases of the inner projections.

2. A sprocket wheel for continuous chain grates having a series of sprocket projections at each end, an intervening receding concaved chain bearing portion, and transverse clearance grooves therein forming continuations of openings which extend to the other side of one series of said sprocket projections.

Signed at New York city in the county of Bronx and State of New York this 20th day of November A. D. 1914.

PAUL L. CROWE.
AARON FRANKENHEIM.

Witnesses:
 LOUIS A. CROWE,
 GEORGE F. BENTLEY.

Copies of this patent may be obtained for five cents each, by addressing the "Commissioner of Patents, Washington, D. C."